US012515232B2

(12) United States Patent
Hyde

(10) Patent No.: US 12,515,232 B2
(45) Date of Patent: Jan. 6, 2026

(54) WINDOW COVERING ASSEMBLY

(71) Applicant: Thomas Hyde, Cincinnati, OH (US)

(72) Inventor: Thomas Hyde, Cincinnati, OH (US)

( * ) Notice: Subject to any disclaimer, the term of this patent is extended or adjusted under 35 U.S.C. 154(b) by 623 days.

(21) Appl. No.: 17/951,253

(22) Filed: Sep. 23, 2022

(65) Prior Publication Data

US 2024/0100555 A1 Mar. 28, 2024

(51) Int. Cl.
*B05B 12/24* (2018.01)
*C09J 7/00* (2018.01)

(52) U.S. Cl.
CPC ................. *B05B 12/24* (2018.02); *C09J 7/00* (2013.01); *C09J 2203/306* (2013.01)

(58) Field of Classification Search
None
See application file for complete search history.

(56) References Cited

U.S. PATENT DOCUMENTS 2,040,988 A * 5/1936 Gragg ........................... 101/127
3,549,448 A 12/1970 Dearing
5,144,736 A * 9/1992 Hanson .................... B60J 11/06 29/403.1
5,193,877 A * 3/1993 George, Jr. ............. B05B 12/24 118/505
5,441,769 A 8/1995 Ross
5,468,538 A 11/1995 Nameche
5,631,055 A * 5/1997 Vines ...................... B05B 12/24 428/354
5,975,621 A * 11/1999 Lefevre ...................... B60J 9/00 296/136.07
6,547,313 B2 * 4/2003 Syron ..................... B05B 12/24 118/505
8,877,311 B1 * 11/2014 Avila ...................... B05B 12/20 428/40.1
D860,682 S 9/2019 Gaetano
2006/0045373 A1 3/2006 Hann
2006/0045973 A1 * 3/2006 Hann ...................... B05B 12/29 118/506
2006/0081344 A1 4/2006 McKearney
2010/0263589 A1 * 10/2010 Dempster ............... B05B 12/20 118/505
2013/0160707 A1 * 6/2013 Moore .................. B05C 21/005 118/505
2016/0340963 A1 11/2016 Loch
2019/0136616 A1 5/2019 Cito

FOREIGN PATENT DOCUMENTS

WO WO2019089040 5/2019

* cited by examiner

*Primary Examiner* — Jethro M. Pence

(57) ABSTRACT

A window covering assembly includes a plurality of adhesive strips that is each positionable on a window of a vehicle. Each of the adhesive strips has a mating element is integrated into a respective adhesive strip. A tarp is positionable over the window when the adhesive strips are adhered to the window to inhibit paint from contacting the window when the paint is being applied to the vehicle. A set of first mating members is each attached to the tarp and each of the first mating members releasably engages the mating element on a respective one of the adhesive strips when the adhesive strips are applied to the window for retaining the tarp on the window.

9 Claims, 6 Drawing Sheets

WINDOW COVERING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to window covering devices and more particularly pertains to a new window covering device for covering windows of a vehicle while the vehicle is being painted. The device includes a plurality of adhesive strips that are positionable on a window of a vehicle and which each has a mating element that is exposed when the adhesive strips are adhered to the window. The device includes a tarp that has a plurality of mating members each being attached to the tarp. Each of the mating members releasably engages the mating element on a respective adhesive member for covering the window. In this way the window is inhibited from being covered with paint when the vehicle is being painted.

(2) Description of Related Art Including Information Disclosed Under 37 CFR 1.97 and 1.98

The prior art relates to window covering devices including a variety of window coverings that each removably adhere to a window of a vehicle for inhibiting the window from being exposed to paint when the vehicle is being painted. The prior art discloses a paint shield that has a pair of panels that are slidably attached together for expanding to fit an opening of various sizes. The prior art discloses a window covering that includes a plurality of adhesive pads that are attachable to a window, an opaque panel and a plurality of adhesive pads applied to the opaque panel that each engages a respective adhesive pad.

BRIEF SUMMARY OF THE INVENTION

An embodiment of the disclosure meets the needs presented above by generally comprising a plurality of adhesive strips that is each positionable on a window of a vehicle. Each of the adhesive strips has a mating element is integrated into a respective adhesive strip. A tarp is positionable over the window when the adhesive strips are adhered to the window to inhibit paint from contacting the window when the paint is being applied to the vehicle. A set of first mating members is each attached to the tarp and each of the first mating members releasably engages the mating element on a respective one of the adhesive strips when the adhesive strips are applied to the window for retaining the tarp on the window.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
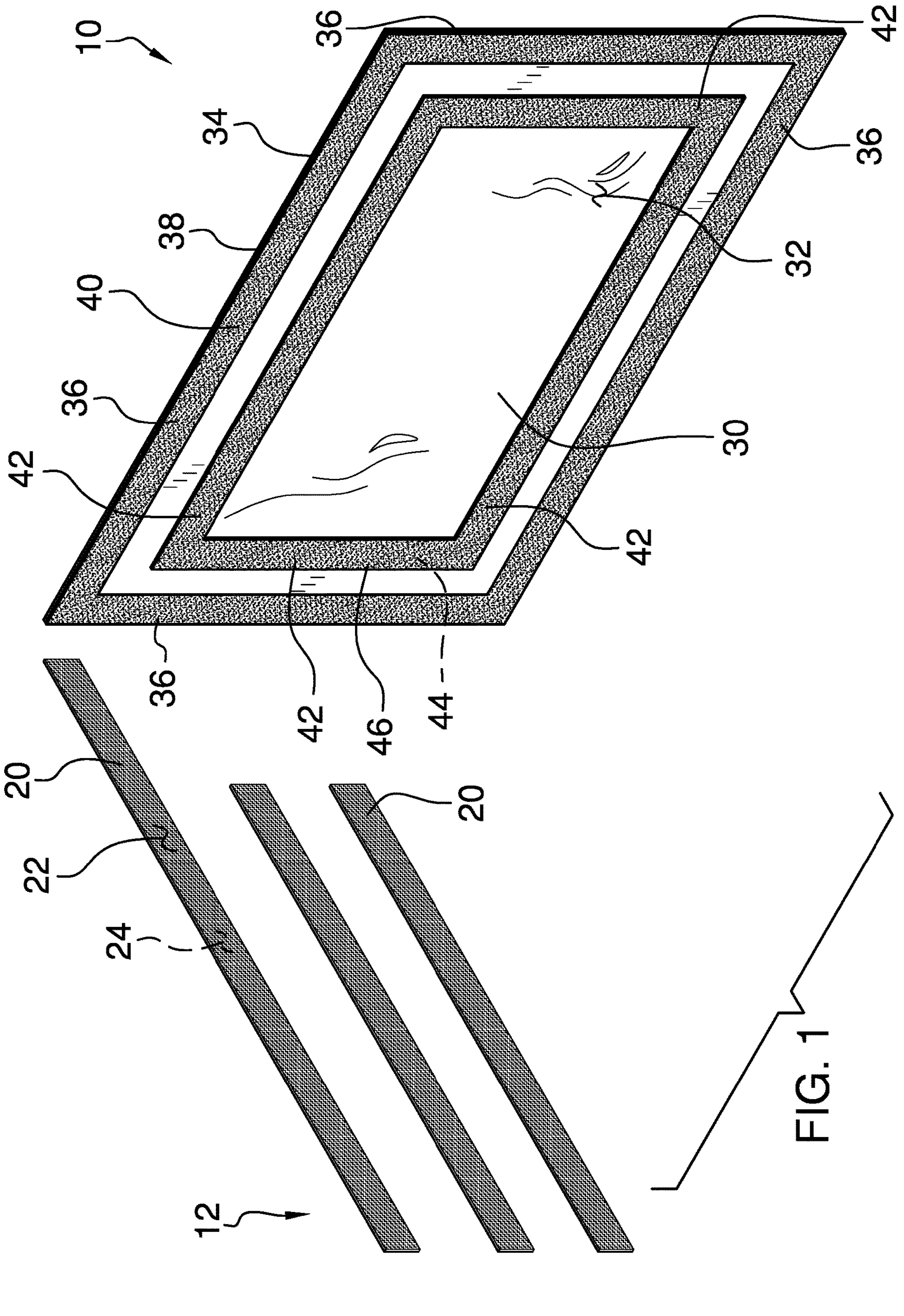
FIG. 1 is a perspective view of a window covering assembly according to an embodiment of the disclosure.
Figure 2:
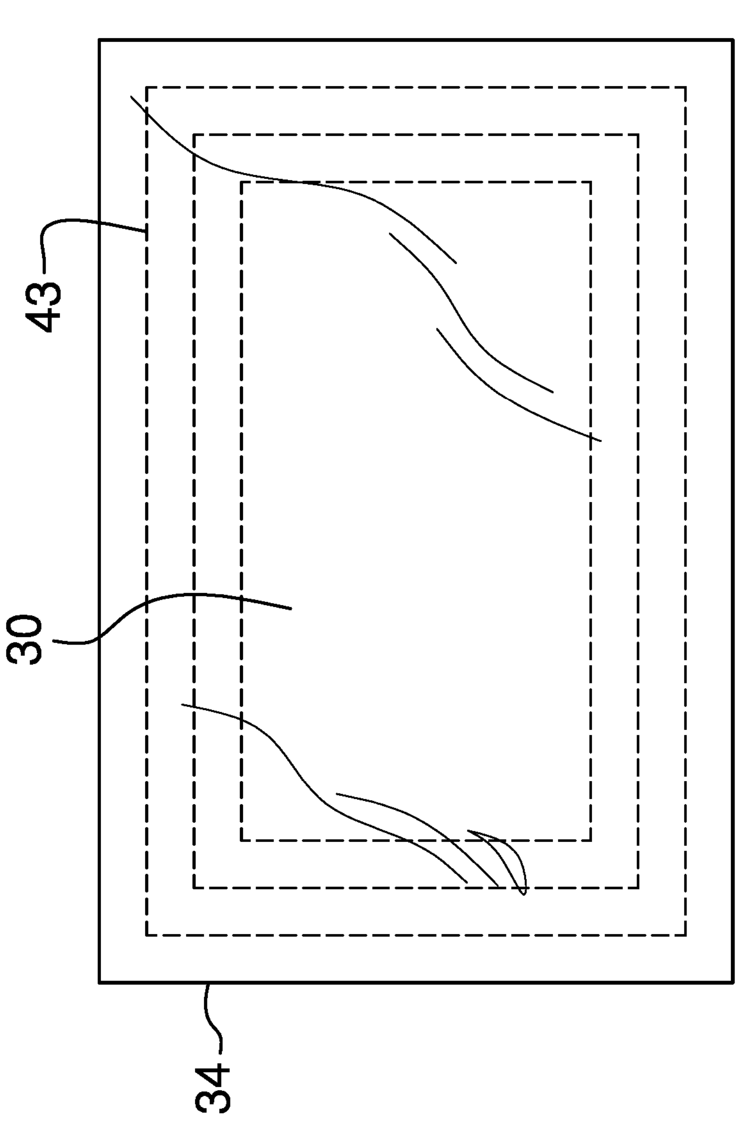
FIG. 2 is a front phantom view of a tarp of an embodiment of the disclosure.
Figure 3:
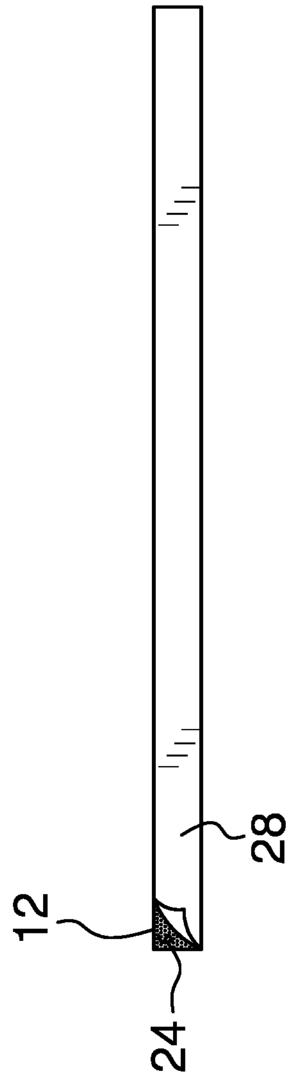
FIG. 3 is a back view of adhesive strip of an embodiment of the disclosure.
Figure 4:
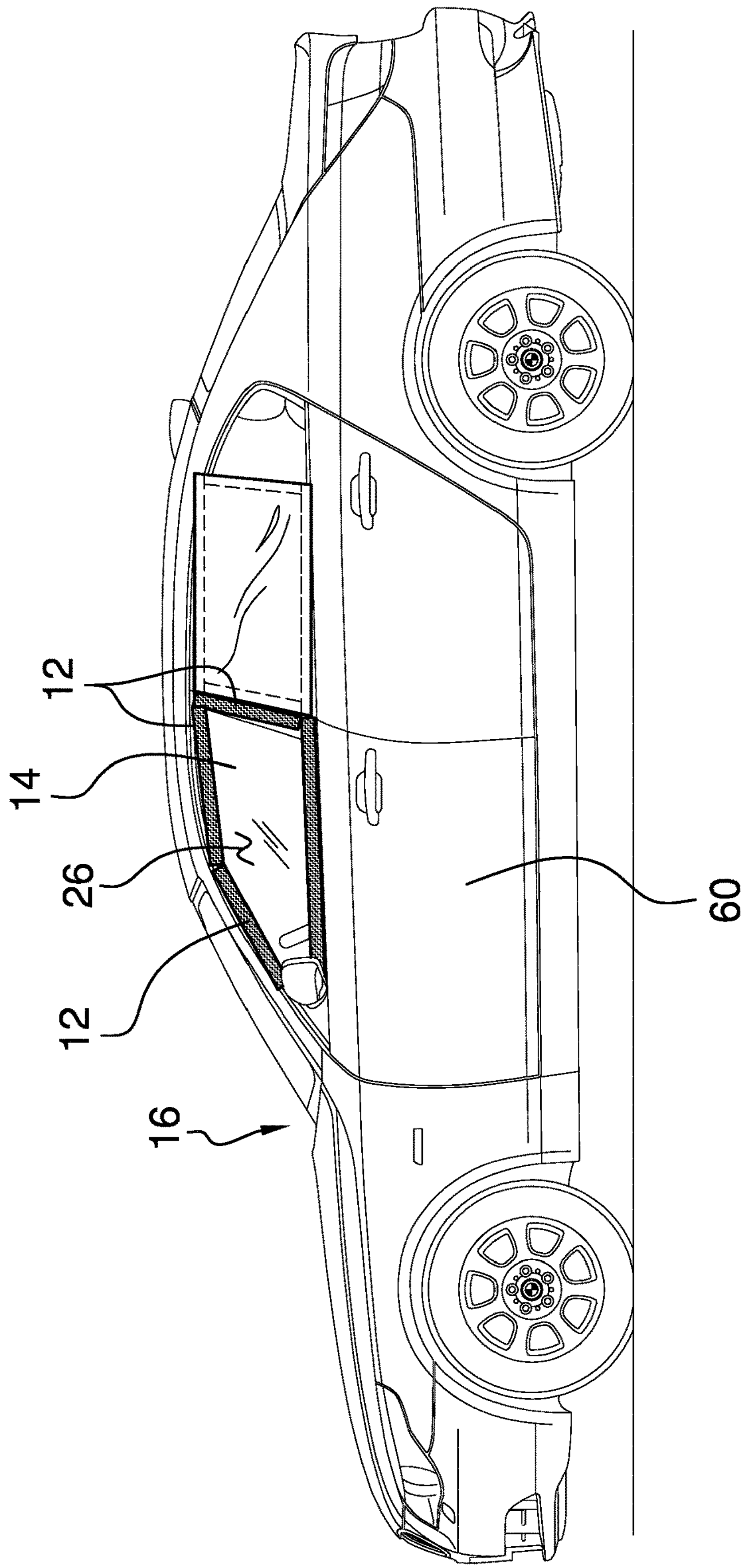
FIG. 4 is a perspective in-use view of an embodiment of the disclosure.

With reference now to the drawings, and in particular to FIGS. 1 through 7 thereof, a new window covering device embodying the principles and concepts of an embodiment of the disclosure and generally designated by the reference numeral 10 will be described.

As best illustrated in FIGS. 1 through 7, the window covering assembly 10 generally comprises a plurality of adhesive strips 12 that is each positionable on a window 14 of a vehicle 16 and is arranged to extend around a perimeter 18 of the window 14. Each of the adhesive strips 12 has a mating element 20 that is integrated into a respective adhesive strip 12 such that the mating element 20 on each of the adhesive strips 12 is exposed when the adhesive strips 12 are adhered to the window 14. The vehicle 16 may be a passenger vehicle, for example, or other type of motorized vehicle that is being painted in an autobody shop. Additionally, the window 14 may be any window that is integrated into the vehicle 16.

Each of the adhesive strips 12 has a first surface 22 and a second surface 24, and the first surface 22 of each of the adhesive strips 12 comprises an adhesive thereby facilitating the adhesive to adhere to an outwardly facing surface 26 of the window 14. The mating element 20 associated with each of the adhesive strips 12 is positioned on the second surface 24 of the respective adhesive strip 12. Additionally, the mating element associated with each of the adhesive strips 12 completely covers the second surface 24 of the respective adhesive strip 12. The mating element 20 associated with each of the adhesive strips 12 may comprise a loop portion of a hook and loop fastener or other type of multiple use, releasable type of mating element. A plurality of protective sheets 28 is provided and each of the protective sheets 28 is removably applied to the first surface 22 of a respective one of the adhesive strips 12 for inhibiting the adhesive on the respective adhesive strip 12 from adhering to an object. Each of the protective sheets 28 completely covers the first surface 22 on the respective adhesive strip 12.

A tarp 30 is positionable over the window 14 when the adhesive strips 12 are adhered to the window 14. The tarp 30 is comprised of a fluid impermeable material to inhibit paint from contacting the window 14 when the paint is being applied to the vehicle 16. The tarp 30 has a rear surface 32 and a perimeter edge 34 and the tarp 30 is constructed to have dimensions and a shape that conforms to the dimensions and the shape of the window 14 on which the tarp 30 is being positioned. Furthermore, a plurality of the tarps 30 may be provided and each of the plurality of tarps 30 may be constructed to conform to the dimensions and shape of a respective one of a variety of different windows 14 on different vehicles 16.

A set of first mating members 36 is provided and each of the first mating members 36 is attached to the tarp 30. Each of the first mating members 36 releasably engages the mating element 20 on a respective one of the adhesive strips 12 when the adhesive strips 12 are applied to the window 14 for retaining the tarp 30 on the window 14. Additionally, each of the set of first mating members 36 has a rear side 38 that abuts the rear surface 32 of the tarp 30 and a front side 40 that is exposed with respect to the rear surface 32. The front side 40 of each of the set of first mating members 36 is matable to the mating element 20 on the respective adhesive strip 12. Furthermore, the set of first mating members 36 are arranged to extend along the perimeter edge 34 of the tarp 30. Each of the first mating members 36 may comprise a hook portion of a hook and loop fastener or other type of multiple use, releasable type of mating member that is complementary to the mating element 20 on the adhesive strips 12.

A set of second mating members 42 is provided and each of the second mating members 42 is attached to the tarp 30. Each of the second mating members 42 releasably engages the mating element 20 on a respective one of the adhesive strips 12 in lieu of the first mating members 36 when the adhesive strips 12 are applied to the window 14 for retaining the tarp 30 on the window 14. The set of second mating members 42 is inset on the tarp 30 with respect to the set of first mating members 36. In this way the tarp 30 to be fitted to a different window 14 compared to the window 14 when the first mating members 36 are employed to engage the mating element 20 the adhesive strips 12. Thus, the total area that the tarp 30 covers on the window 14 can be reduced when the second mating members 42 are employed compared to when the first mating members 36 are employed. Each of the first mating members 36 and the second mating members 42 may be sewn to the tarp 30 with stitching 43 as is most clearly shown in FIG. 2.

Each of the set of second mating members 42 has a rear side 44 which abuts the rear surface 32 of the tarp 30 and a front side 46 that is exposed with respect to the rear surface 32. Each of the set of second mating members 42 is spaced from a respective one of the set of first mating members 36. Each of the set of second mating members 42 is oriented parallel with the respective first mating member 36. Additionally, each of the second mating members 42 may comprise a hook portion of a hook and loop fastener or other type of multiple use, releasable type of mating member that is complementary to the mating element 20 on the adhesive strips 12.

Figure 5:
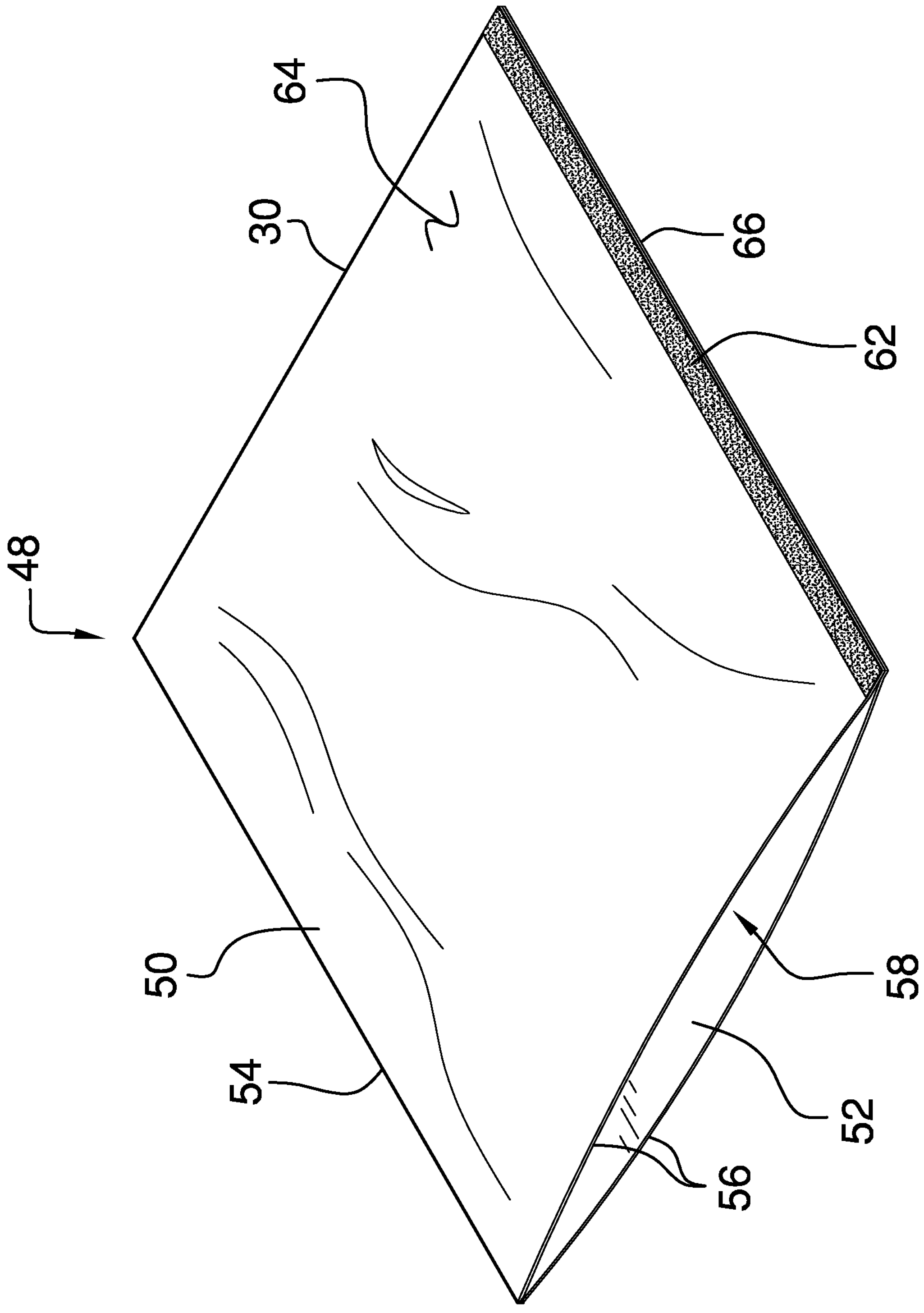
FIG. 5 is a perspective view of an alternative embodiment of the disclosure.

In an alternative embodiment 48 as is most clearly shown in FIG. 5, the tarp 30 includes a first layer 50 and a second layer 52 and a perimeter edge 54 of each of the first layer 50 and the second layer 52 includes a first lateral side 56. The perimeter edge 54 of the first layer 50 is attached to the perimeter edge 54 of the second layer 52 except for the first lateral side 56 of the perimeter edge 54 of the first layer 50 and the first lateral side 56 of the perimeter edge 34 of the second layer 52. Furthermore, the first lateral side 56 of the perimeter edge 54 of each of the first layer 50 and the second layer 52 defines an opening 58 into the tarp 30 thereby facilitating the tarp 30 to be positioned over a door 60 of the vehicle 16. A mating member 62 is attached to an outer surface 64 of the first layer 50 and the mating member 62 is aligned to be coextensive with a top side 66 of the perimeter edge 54 of the first layer 50. The mating member 62 may comprise a hook and loop fastener or other type of multiple use, releasable mating member.

Figure 6:
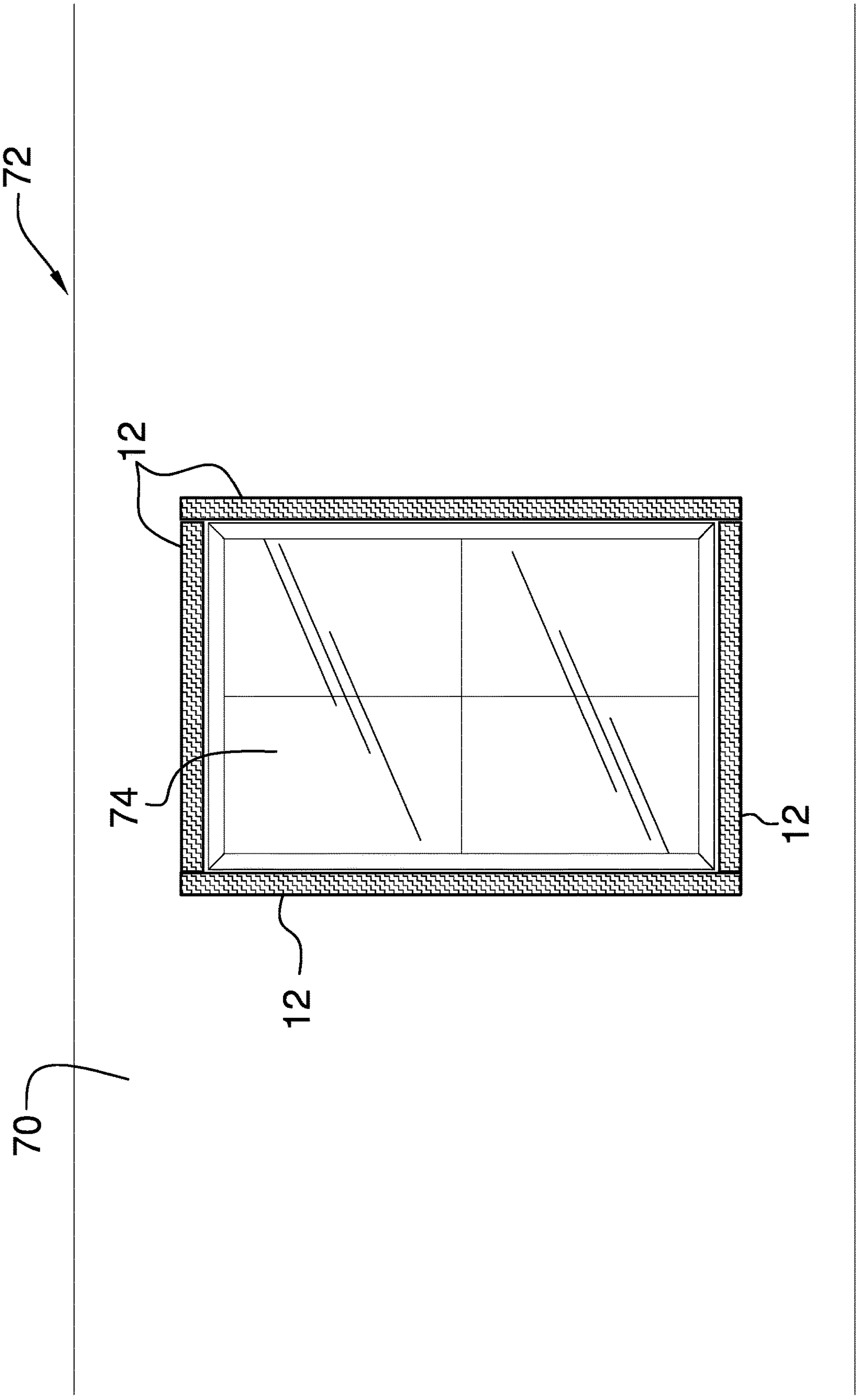
FIG. 6 is a perspective in-use view of an alternative embodiment of the disclosure showing adhesive strips positioned on an interior wall of a building.
Figure 7:
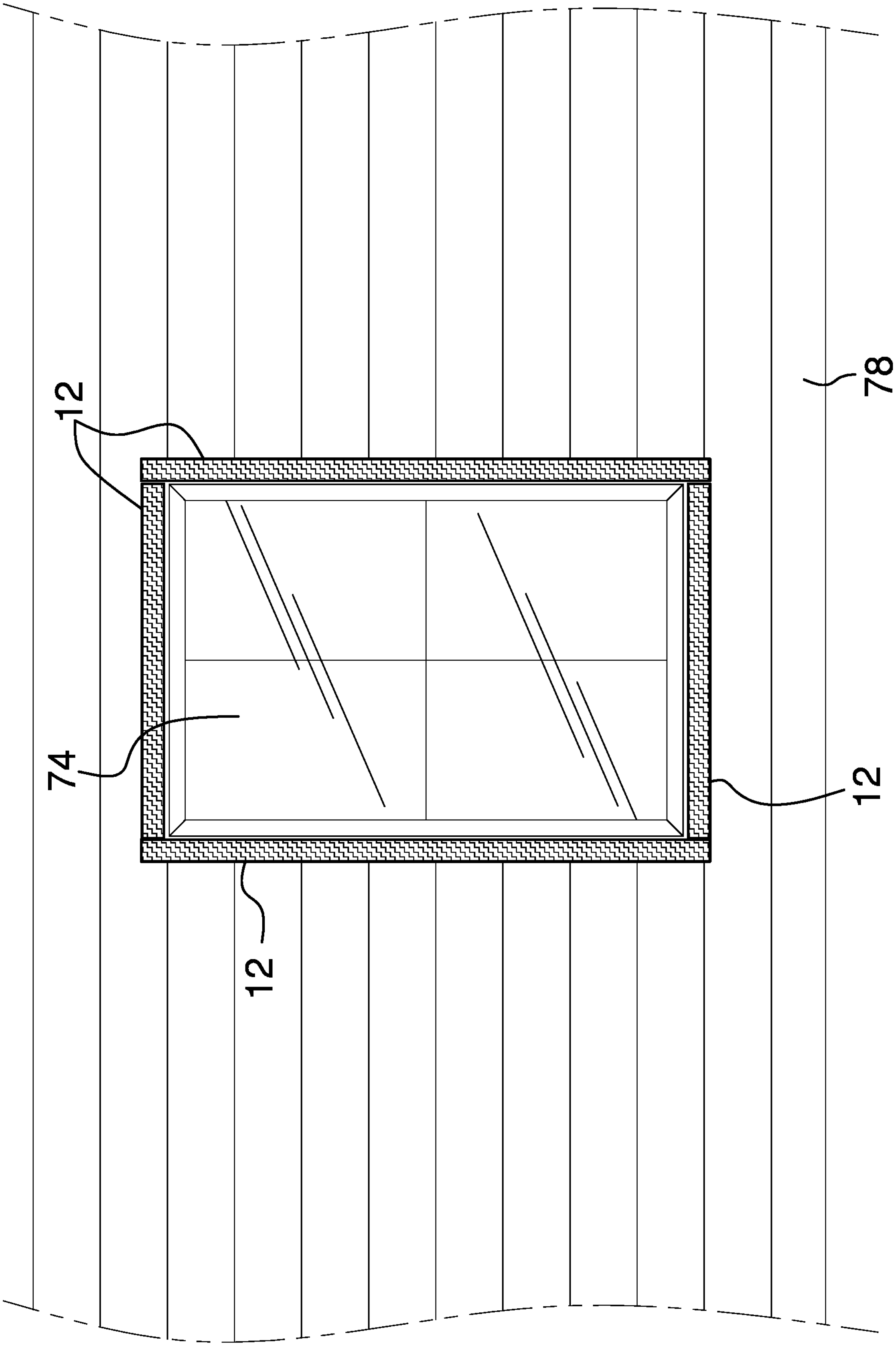
FIG. 7 is a perspective in-use view of an alternative embodiment of the disclosure showing adhesive strips being positioned on a exterior wall of a building.

In an alternative embodiment 68 as is most clearly shown in FIG. 6, the adhesive strips 12 can be adhered to an interior wall 70 of a building 72 such that the adhesive strips 12 surround a window 74 in the building 72. In this way the tarp 30 can be positioned to cover the window 74 in the building 72 thereby facilitating the interior wall 70 of the building 72 to be painted without painting the window 74 in the building 72. In an alternative embodiment 76 as is most clearly shown in FIG. 7, the adhesive strips 12 can be adhered to an exterior wall 78 of the building 72 such that the adhesive strips 12 surround the window 74 in the building 72. In this way the tarp 30 can be positioned to cover the window 74 in the building 72 thereby facilitating the exterior wall 78 of the building 72 to be painted without painting the window 74 in the building 72.

In use, the adhesive strips 12 are cut to a desired length and each of the adhesive strips 12 is adhered to the outwardly facing surface 26 of the window 14 such that the adhesive strips 12 extend around a perimeter of the window 14 having the mating element on each of the adhesive strips 12 being exposed. The tarp 30 is positioned on the outwardly facing surface 26 of the window 14 such that each of the set of first mating members 36 releasably engages a mating element 20 on a respective one of the adhesive strips 12. In this way the tarp 30 inhibits the window 14 from being exposed to paint while the vehicle 16 is being painted. Thus, time is saved as compared to the traditional method of covering windows 14 with masking tape and paper prior to painting a vehicle 16. The set of second mating members 42 can be positioned to engage the mating element 20 on the respective adhesive strip 12 to facilitate the tarp 30 to cover a window 14 that is smaller than the area on the tarp 30 defined by the set of first mating members 36.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A window covering assembly for inhibiting a window of a vehicle from being exposed to paint while the vehicle is being painted, said assembly comprising:

a plurality of adhesive strips each being positionable on the window of the vehicle and being arranged to extend around a perimeter of the window, each of said adhesive strips having a mating element being integrated into a respective adhesive strip such that said mating element on each of said adhesive strips is exposed when said adhesive strips are adhered to the window;

a tarp being positionable over the window when said adhesive strips are adhered to the window, said tarp being comprised of a fluid impermeable material wherein said tarp is configured to inhibit paint from contacting the window when the paint is being applied to the vehicle;

a set of first mating members, each of said first mating members being attached to said tarp, each of said first mating members releasably engaging said mating element on a respective one of said adhesive strips when said adhesive strips are applied to the window for retaining said tarp on the window; and a set of second mating members, each of said second mating members being attached to said tarp, each of said second mating members releasably engaging said mating element on a respective one of said adhesive strips in lieu of said first mating members when said adhesive strips are applied to the window for retaining said tarp on the window, said set of second mating members being inset on said tarp with respect to said set of first mating members thereby facilitating said tarp to be fitted to a different window compared to the window when said first mating members are employed to engage said mating element said adhesive strips.

2. The assembly according to claim 1, wherein each of said adhesive strips has a first surface and a second surface, said first surface of each of said adhesive strips comprising an adhesive layer thereby facilitating said adhesive layer to adhere to an outwardly facing surface of the window, said mating element associated with each of said adhesive strips being positioned on said second surface of said respective adhesive strip, said mating element associated with each of said adhesive strips completely covering said second surface of said respective adhesive strip.

3. The assembly according to claim 2, further comprising a plurality of protective sheets, each of said protective sheets being removably applied to said first surface of a respective one of said adhesive strips for inhibiting said adhesive of said respective adhesive strip from adhering to an object, each of said protective sheets completely covering said first surface of said respective adhesive strip.

4. The assembly according to claim 1, wherein:

said tarp has a rear surface and a perimeter edge; and each of said set of first mating members has a rear side abutting said rear surface of said tarp and a front side being exposed with respect to said rear surface, said set of first mating members being arranged to extend along said perimeter edge of said tarp.

5. The assembly according to claim 4, wherein said front side of each of said set of first mating members is matable to said mating element on said respective adhesive strip.

6. The assembly according to claim 4, wherein each of said set of second mating members has a rear side abutting said rear surface of said tarp and a front side being exposed with respect to said rear surface, each of said set of second mating members being spaced from a respective one of said set of first mating members, each of said set of second mating members being oriented parallel with said respective first mating member.

7. A window covering assembly for inhibiting a window of a vehicle from being exposed to paint while the vehicle is being painted, said assembly comprising:

a plurality of adhesive strips each being positionable on the window of the vehicle and being arranged to extend around a perimeter of the window, each of said adhesive strips having a mating element being integrated into a respective adhesive strip such that said mating element on each of said adhesive strips is exposed when said adhesive strips are adhered to the window, each of said adhesive strips having a first surface and a second surface, said first surface of each of said adhesive strips comprising an adhesive layer thereby facilitating said adhesive layer to adhere to an outwardly facing surface of the window, said mating element associated with each of said adhesive strips being positioned on said second surface of said respective adhesive strip, said mating element associated with each of said adhesive strips completely covering said second surface of said respective adhesive strip;

a plurality of protective sheets, each of said protective sheets being removably applied to said first surface of a respective one of said adhesive strips for inhibiting said adhesive on said respective adhesive strip from adhering to an object, each of said protective sheets completely covering said first surface on said respective adhesive strip;

a tarp being positionable over the window when said adhesive strips are adhered to the window, said tarp being comprised of a fluid impermeable material wherein said tarp is configured to inhibit paint from contacting the window when the paint is being applied to the vehicle, said tarp having a rear surface and a perimeter edge;

a set of first mating members, each of said first mating members being attached to said tarp, each of said first mating members releasably engaging said mating element on a respective one of said adhesive strips when said adhesive strips are applied to the window for retaining said tarp on the window, each of said set of first mating members having a rear side abutting said rear surface of said tarp and a front side being exposed with respect to said rear surface, said front side of each of said set of first mating members being matable to said mating element on said respective adhesive strip, said set of first mating members being arranged to extend along said perimeter edge of said tarp; and a set of second mating members, each of said second mating members being attached to said tarp, each of said second mating members releasably engaging said mating element on a respective one of said adhesive strips in lieu of said first mating members when said adhesive strips are applied to the window for retaining said tarp on the window, said set of second mating members being inset on said tarp with respect to said set of first mating members thereby facilitating said tarp to be fitted to a different window compared to the window when said first mating members are employed to engage said mating element said adhesive strips, each of said set of second mating members having a rear side abutting said rear surface of said tarp and a front side being exposed with respect to said rear surface, each of said set of second mating members being spaced from a respective one of said set of first mating members, each of said set of second mating members being oriented parallel with said respective first mating member.

8. The assembly according to claim 6, wherein said tarp includes a first layer and a second layer, said perimeter edge of each of said first layer and said second layer including a first lateral side, said perimeter edge of said first layer being attached to said perimeter edge of said second layer except for said first lateral side of said perimeter edge of said first layer and said first lateral side of said perimeter edge of said second layer, said first lateral side of said perimeter edge of each of said first layer and said second layer defining an opening into said tarp thereby facilitating said tarp to be positioned over a door of the vehicle.

9. The assembly according to claim 7, further comprising a mating member being attached to an outer surface of said first layer, said mating member being aligned to be coextensive with a top side of said perimeter edge of said first layer.

* * * * *